W. S. WATSON.
DEMOUNTABLE RIM.
APPLICATION FILED MAR. 29, 1917.
1,358,803.
Patented Nov. 16, 1920.
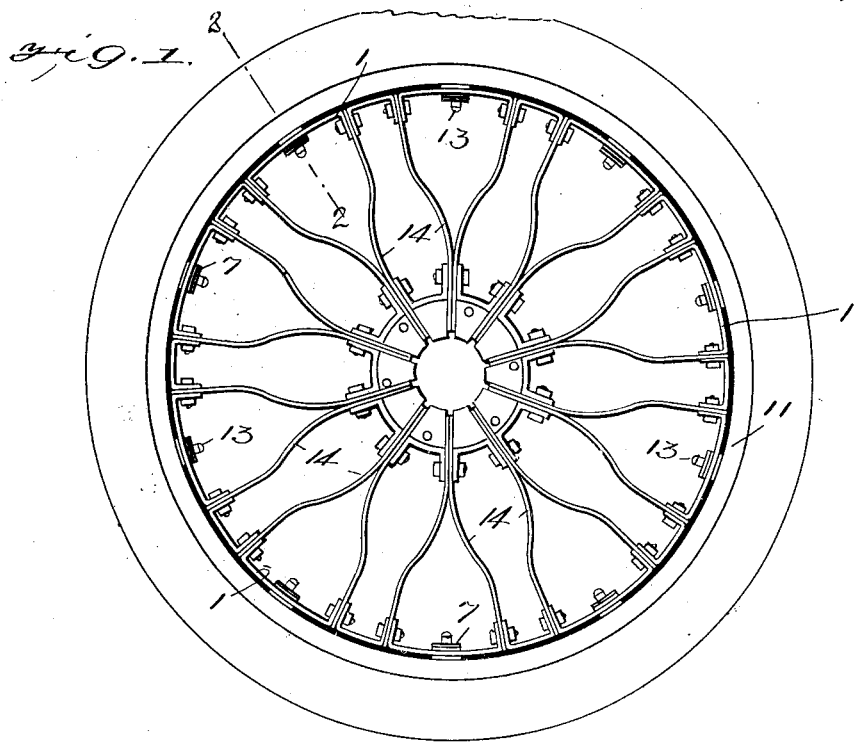
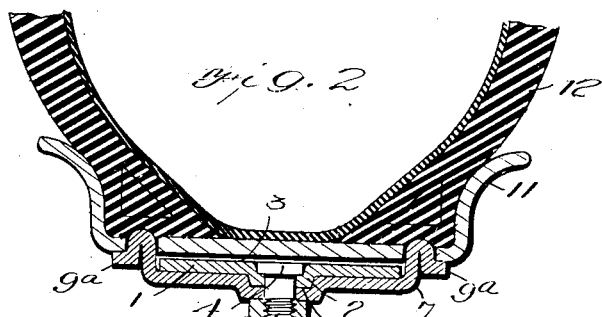
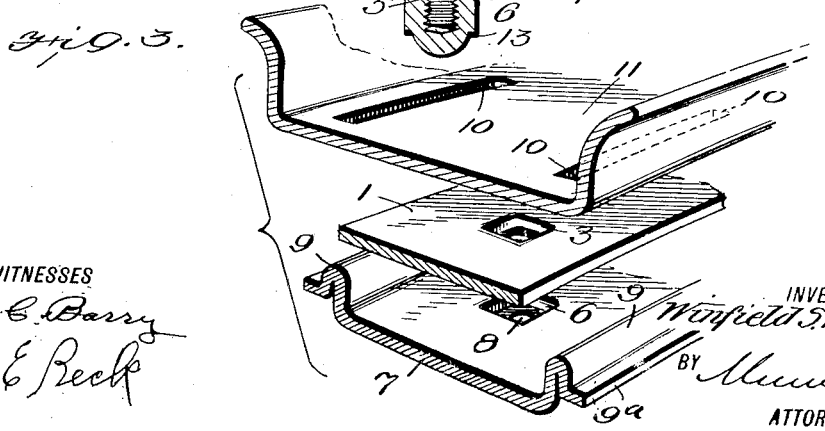
WITNESSES
INVENTOR
Winfield S. Watson
BY
ATTORNEYS

UNITED STATES PATENT OFFICE.

WINFIELD S. WATSON, OF CLEVELAND, OHIO.

DEMOUNTABLE RIM.

1,358,803.  Specification of Letters Patent.  Patented Nov. 16, 1920.

Application filed March 29, 1917. Serial No. 158,252.

*To all whom it may concern:*

Be it known that I, WINFIELD S. WATSON, a citizen of the United States, and a resident of Cleveland, in the county of Cuyahoga and State of Ohio, have invented a certain new and useful Improvement in Demountable Rims, of which the following is a specification.

My invention relates to improvements in demountable rims for vehicle wheels, and it consists in the combinations, constructions, and arrangements herein described and claimed.

An object of my invention is to provide a demountable rim which is secured to the inner rim without necessitating the use of wedges that are liable to distort the wheel, and thereby cause excessive wear on the tire.

A further object of my invention is to provide a rim having adjustable fastening means, so that the pressure may be equally distributed around through the wheel.

A further object of my invention is to provide a demountable rim which is especially adapted for use with inner rims of the flat band type, especially where said inner rims are connected with flat steel spokes.

A further object of my invention is to provide a demountable rim, which is cushioned at the point of contact with the inner rim, said cushioning being effected by reason of the fact that the fastening means projects through the demountable rim and comes into contact with the base of the tire.

Other objects and advantages will appear in the following specification, and the novel features of the invention will be particularly pointed out in the appended claim.

My invention is illustrated in the accompanying drawings forming a part of this application, and in which:

Figure 1 is a face view of a wheel constructed according to my invention;

Fig. 2 is an enlarged sectional view along the line 2—2 of Fig. 1, and

Fig. 3 shows portions of the detachable rim, the inner rim, and the locking mechanism, these parts being spaced parts.

In carrying out my invention I make use of an inner rim 1, this rim consisting preferably of a series of arc shaped sections bolted together, as distinguished from the ordinary rolled rim. Alternate sections are provided with a boss 2 having a central opening. The side of the rim opposite the boss is provided with a recess 3 arranged to receive the head 4 of a bolt 5, see Fig. 2. The boss is arranged to fit in a recess 6 in a locking plate 7. The latter is provided with a registering opening 8, through which the body portion of the bolt 5 may pass. The plate 7 has, along its sides, ridges or flanges 9 which are struck up so as to enter openings 10 in the demountable member 11. The latter in the present instance is formed for receiving a straight side tire. Plain clencher, clencher detachable, straight side detachable, or any other shape may be used.

From the foregoing description of the various parts of the device, the operation thereof may be readily understood.

The tire 12 is inflated on the rim 11 in the usual manner, and the latter is slipped over the inner rim 1. The nut 13 on the end of the bolt 5 is now tightened, and this will force the ridges 9 through the openings 10, bringing the ridges into engagement with the base of the rubber tire 12. The flanges $9^a$ outside the ridges 9, engage the inner sides of the demountable rim 11, while the ridges themselves pass through the openings 10 and engage the base of the tire, as clearly shown in Fig. 2. It will be observed that these ridges 9 pass on either side of the inner rim 1, so that the demountable rim is locked to the inner rim, as far as lateral motion is concerned. It is also locked to it as far as radial motion is concerned, because of the entry of the ridges 9 within the openings 10. When the nut 13 is tightened, the locking plate 7 is moved into such position that the boss 2 of the inner rim enters the recess 6 of the plate 7, thus securing the parts together and preventing their rotation about the axis of the locking bolt 5.

The construction described forms a ready means of attaching or detaching the demountable rim. It is obvious that, since the fastening means is on both sides of the center of the inner rim, there can be no distorting wedging action, as is the case where wedges are inserted between the inner and the demountable rim and are screwed up so as to distort the wheel. By adjusting the nuts 13 the tension on the wheel may be evenly distributed around the wheel, so that the wheel may be perfectly true or approximately true.

In use the pressure of the tire will be transmitted to the ridges 9 which will tend to cushion the shocks, thus relieving the demountable rim of a certain portion of the jars wihch are incident to ordinary travel. The nuts 13 may be unloosened quickly when it is desired to remove the demountable rim. The resiliency of the tires, together with the fact that the band 1 is under tension, tends to force the locking member 7 inwardly so as to disconnect the demountable rim from the inner rim. It is desirable to turn the wheel into the position shown in Fig. 2, so that gravity may also assist the retraction of the locking member 7 when it is being withdrawn. Conversely, the wheel should be turned so as to assist the movement of the ridges 9 into their respective slots or openings 10 when the demountable rim is being replaced. Obviously, however, the screwing of the nut 13 would force the locking plate into position no matter what the relative position of the wheel.

In Fig. 2 I have shown these locking members as being disposed between adjacent pairs of spokes 14, it being understood, of course, that more or less of the locking devices might be used around the wheel, without departing from the spirit of the invention.

I claim:

The combination with a demountable rim, of a pneumatic tire carried thereby, said rim having slots adjacent to the base of the tire, means for securing said rim to the wheel comprising an inner rim having a boss, a locking plate having a recess arranged to receive said boss, a bolt for connecting said inner rim to said locking plate, flanges carried by said locking plate and arranged to enter the slots in said demountable rim, and a nut carried by the bolt for forcing the locking plate inwardly.

WINFIELD S. WATSON.